United States Patent
Lennon

(10) Patent No.: US 10,196,277 B2
(45) Date of Patent: Feb. 5, 2019

(54) METHOD FOR COMPRESSION OF AMMONIA SYNTHESIS GAS AND RECYCLE GAS FOR THE PRODUCTION OF AMMONIA BY SCREW COMPRESSORS

(71) Applicant: Derek Carlton Lennon, Is-Swieqi (MT)

(72) Inventor: Derek Carlton Lennon, Is-Swieqi (MT)

(*) Notice: Subject to any disclaimer, the term of this patent is extended or adjusted under 35 U.S.C. 154(b) by 0 days.

(21) Appl. No.: 15/832,220

(22) Filed: Dec. 5, 2017

(65) Prior Publication Data

US 2018/0093898 A1 Apr. 5, 2018

Related U.S. Application Data

(63) Continuation-in-part of application No. 14/987,779, filed on Jan. 5, 2016.

(51) Int. Cl.
| | |
|---|---|
| *C01C 1/04* | (2006.01) |
| *C01B 3/02* | (2006.01) |
| *F04C 18/16* | (2006.01) |
| *B01J 10/00* | (2006.01) |
| *F04C 23/00* | (2006.01) |

(52) U.S. Cl.
CPC ............ *C01C 1/04* (2013.01); *B01J 10/00* (2013.01); *C01B 3/025* (2013.01); *F04C 18/16* (2013.01); *F04C 23/003* (2013.01); *F04C 2210/224* (2013.01); *F04C 2210/225* (2013.01)

(58) Field of Classification Search
CPC .... C01B 2203/0233; C01B 2203/0244; C01B 2203/0283; C01B 2203/0415; C01B 2203/042; C01B 2203/0445; C01B 2203/046; C01B 2203/047; C01B 2203/0475; C01B 2203/0495; C01B 2203/068; C01B 2203/1241; C01B 2203/142; C01B 2203/143; C01B 2203/147; C01B 3/025; C01B 3/382; C01B 3/384; C01B 3/48; C01B 3/506; C01B 3/52; C01B 3/56; C01B 3/586; C01C 1/0441; C01C 1/0405
USPC ................................ 418/1; 423/359, 360
See application file for complete search history.

(56) References Cited

U.S. PATENT DOCUMENTS

| | | | |
|---|---|---|---|
| 8,021,464 B2 * | 9/2011 | Gauthier | C01B 3/48 95/96 |
| 8,247,463 B2 | 8/2012 | Yoshida et al. | |
| 8,679,439 B2 | 3/2014 | Randhava et al. | |
| 2003/0211026 A1 * | 11/2003 | Moore | C01C 1/0405 423/359 |
| 2011/0206594 A1 | 8/2011 | Singh et al. | |
| 2011/0223090 A1 | 9/2011 | Filippi et al. | |
| 2017/0190590 A1 * | 7/2017 | Lennon | C01C 1/04 |

* cited by examiner

*Primary Examiner* — Mark Laurenzi
*Assistant Examiner* — Paul Thiede
(74) *Attorney, Agent, or Firm* — Maier & Maier, PLLC

(57) ABSTRACT

A method for producing ammonia may be provided. The method may include supplying ammonia synthesis gas to a synthesis gas screw compressor and compressing the synthesis gas. The compressed synthesis gas may be joined with a flow of recycle gas compressed in a recycle gas screw compressor. The compressed combined flow may then be introduced to an ammonia reactor. The ammonia reactor may discharge ammonia, purge gas, and unconverted gas, which may be the recycle gas.

6 Claims, 3 Drawing Sheets

METHOD FOR COMPRESSION OF AMMONIA SYNTHESIS GAS AND RECYCLE GAS FOR THE PRODUCTION OF AMMONIA BY SCREW COMPRESSORS

CROSS-REFERENCE TO RELATED APPLICATIONS

This application claims priority as a Continuation-In-Part application of U.S. patent application Ser. No. 14/987,779, filed on Jan. 5, 2016, the contents of which is hereby incorporated by reference in its entirety.

BACKGROUND

The discovery of Haber and developments by Bosch of the reaction $N_2+3H_2=2NH_3$ to produce ammonia was in relation to the World an epoch-making discovery and led to ammonia being one of the top tonnage chemicals in World production.

There is no doubt that without this discovery the burgeoning world population would have been subject to increased starvation.

The first commercial production of 20 metric tons of ammonia per day was by BASF in 1913. This enabled the Germans to produce nitrate explosives without the import of Chilean Saltpetre an important factor in World War I.

One of the pioneers in the subsequent development of the ammonia synthesis was the Italian company Ammonia Casale who have remained a world leader.

Casale recommended a synthesis pressure of 600 atm so the ammonia ex the reactor could be condensed without a refrigeration compressor. Post World War II ammonia plants tended to have a capacity of around 300 metric tons/day the limitation being the size of the reciprocating synthesis compressors which in general were horizontally opposed units.

In Wyoming for example these plants were considered rather like gas stations serving an agricultural community of around 250-mile radius curve from the ammonia production. In 1954 Torresy and Hamilton produced designs for skid mounted units of 100 and 200 short tons/day of ammonia. These plants had horizontally opposed reciprocating synthesis gas driven by synchronous electric motors. Specific consumption in thermally equivalent gas was 50 MM BTU/metric ton of ammonia. Some 30 of these plants which were fabricated by Krupp in Germany and Voest in Austria were sold worldwide and some are still operating including one in Sudan which was never started up because the Sudanese government did not supply the gas. Commercially these plants were a success at the time because the buyer had only to provide the civil work for the foundations and the need for mechanical erection was eliminated.

In the 1960's the M.W. Kellogg Company opened the era of mega-ammonia plants with a radical new design. This design involved raising steam from the primary and secondary reformer to supply steam turbines driving the centrifugal synthesis gas, recycle and refrigeration compressors and reducing the ammonia synthesis pressure to between 140 and 160 atm. Gas consumption was reduced to around 30 MMBTU/metric ton of ammonia with the plant having minimal electricity consumption. The centrifugal compressors opened the way to increased flows and consequently higher ammonia capacity. The first plant to utilize the process was the Mississippi Chemical Corporation with a capacity of 1000 metric tons/day. However, the physical limitations of centrifugal compressors meant it was not possible to design ammonia plants with a capacity of or below 500 metric tons/day.

For this development M.W. Kellogg received the prestigious 1967 Kirkpatrick Chemical Engineering Award. In Van Nostrand's Scientific Encyclopedia Eighth Edition a Reference 1 this is described and the following statements made "Most ammonia plants built since early 1960s in the 600-1500 short tons of ammonia per day are based on the new integrated process"

"One of the major factors contributing to the improved economics of ammonia plant is the application of multistage centrifugal compressors which have replaced reciprocating compressors traditionally used in the synthesis feed and recycle service by a single centrifugal compressor"

"Developments have been centered around the 1960s basic process scheme with modifications to improve efficiency therefore the basic process steps have not changed in any major way"

The first statement of a lower limit of 600 short tons a day of ammonia was because this was the lower limit of the recycle wheel in the centrifugal compressor in this process design.

Until today ammonia plants of this lower capacity have used reciprocating compressors for the synthesis and recycle duty. Reciprocating compressors are expensive and require frequent maintenance.

The cost of ammonia production is largely based on two factors, the price of gas and the capital charges.

New ammonia plants producing 2000 metric tons of ammonia per day with an accompanying urea plant can cost around $1 billion and face major problems in implementation. Financiers cannot often obtain adequate information on the security of the market. The plants are often projected in areas where the field construction is difficult and the cost uncertain. Buyers normally want turnkey plants. This compels the contractor to include high levels of profit and contingency to cover the risk.

This all points to the need to develop small economic ammonia plants which can be situated in countries where the fertilizer consumption per unit area is low and also in countries where cheap fracked gas is available such as the United States.

Small ammonia plants will not succeed unless their gas consumption per metric ton of ammonia is equivalent to that of a major scale plant and further their capital cost is pro-rata to that of the larger plant.

It therefore may be desired for a process method of removing this bottleneck and lowering the cost of ammonia plants. Two recent improvements have contributed to this ability. Improved ammonia synthesis catalysts lead to the ability to synthesize ammonia at a pressure between 70-120 bar. Concurrently in 2009 KOBELCO, Japan developed the first screw compressors capable of a delivery pressure of 100 bar. Previously screw compressors which were widely used had a maximum delivery pressure of 66 bar.

SUMMARY

A method for producing ammonia may be provided. The method may include supplying ammonia synthesis gas to a synthesis gas screw compressor and compressing the synthesis gas. The compressed synthesis gas may be joined with a flow of compressed recycle gas The compressed combined flow may then be introduced to an ammonia reactor. The ammonia reactor may discharge ammonia, purge gas, and unconverted gas, which may be the recycle gas. The recycle gas may be compressed in a recycle gas compressor and supplied to the flow of compressed ammonia synthesis gas.

According to another exemplary embodiment, a method for producing ammonia may be provided. The method may include supplying ammonia synthesis gas to a screw compressor. A flow of recycle gas may also be introduced to the screw compressor. The ammonia synthesis gas and recycle gas may be compressed in the screw compressor. A flow of compressed ammonia synthesis gas and recycle gas may be discharged as a combined gas flow. The compressed combined gas flow may be supplied to an ammonia reactor. The ammonia reactor may discharge ammonia, purge gas, and recycle gas. The recycle gas may be supplied to the screw compressor.

According to yet another exemplary embodiment, an apparatus for producing ammonia may be provided. The apparatus for producing ammonia may include an ammonia reactor configured to receive compressed ammonia synthesis gas and compressed recycle gas and discharge ammonia product, purge gas, and recycle gas. The apparatus may further include a synthesis gas screw compressor configured to compress a flow of ammonia synthesis gas and supply the flow of compressed ammonia synthesis gas to the ammonia reactor. The apparatus may also include a recycle gas screw compressor configured to receive recycle gas from the ammonia reactor, compress the recycle gas, and reintroduce the recycle gas to the ammonia reactor.

DETAILED DESCRIPTION OF THE INVENTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to the present invention, the use of screw compressors compressing to 120 bar may be utilized, which has never been used for the compression of synthesis gas and the recycle gas. This enables the utilization of the waste heat from the synthesis gas plant and with a conventional methane reformer system leads to a gas consumption of 30 MMBTU/metric ton of ammonia. With improved designs in the reformer section, the utilization of the screw compressors as detailed herein, and low cost skid assembly, the capital cost can be matched pro-rata to a larger plant.

According to an exemplary embodiment, a method may be provided for compressing pure ammonia synthesis gas $N_2+3H_2$, or with limited content of methane and inert gases and recycle gas, by a screw compressor. The synthesis gas screw compressor compressing ammonia synthesis gas with a pressure of between 20 bar and 50 bar, with a volume limited to 60,000 standard cubic meters per hour up to 120 bar discharge pressure, according to the block flow drawing.

Figure 1:
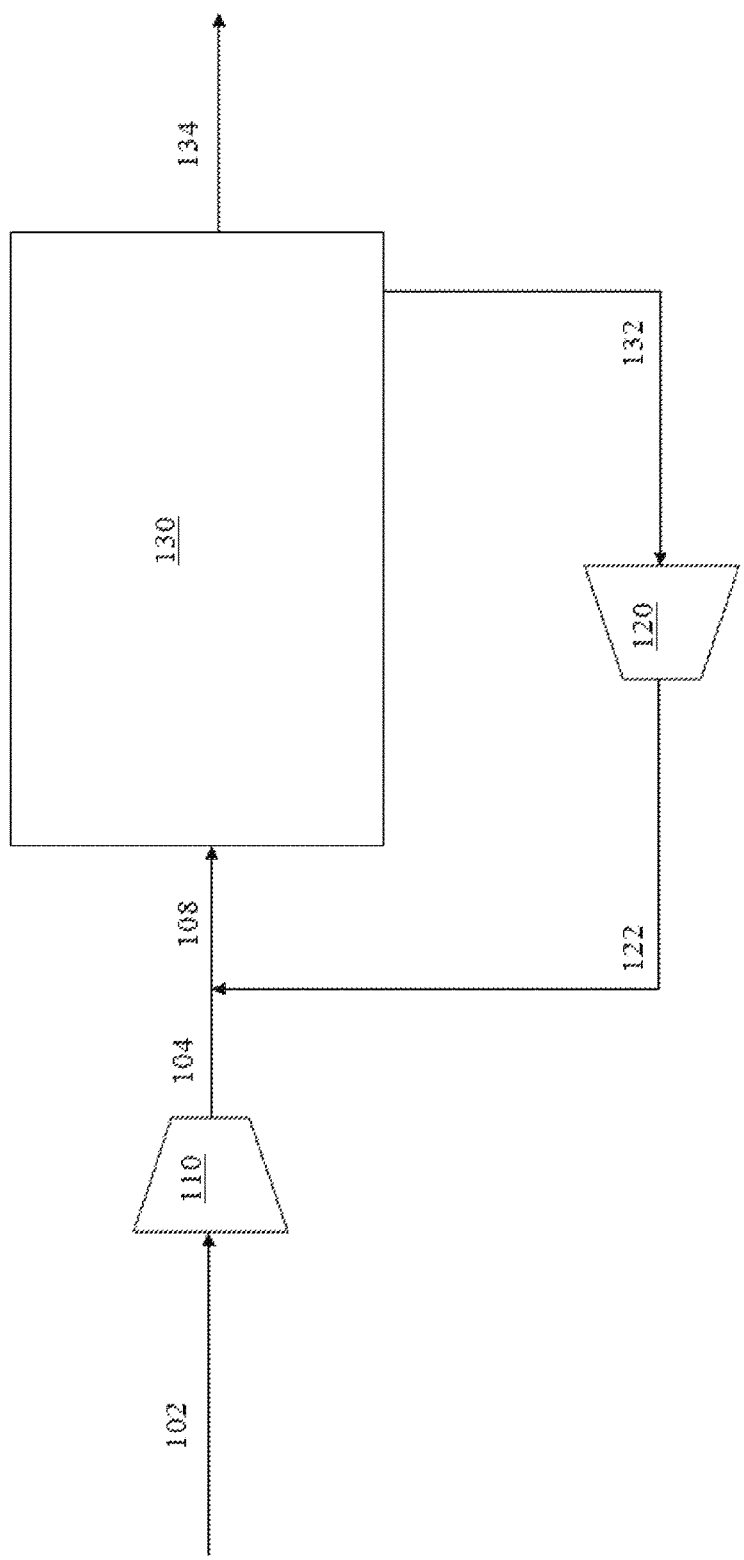
FIG. 1 shows an exemplary block flow chart configuration for the compression of ammonia synthesis gas and recycle gas for the production of ammonia by screw compressors.

Now referring to exemplary FIG. 1, ammonia synthesis gas 102, $N_2+3H_2$, may be supplied to a synthesis gas screw compressor 110. The synthesis gas 102 (syngas) may have the stoichiometric volumes of nitrogen and hydrogen for ammonia synthesis and may have small amounts of impurities such as inert gases and methane. In some exemplary embodiments, the syngas may be in the near molar proportions of 1:3. The ammonia synthesis gas 102 may be supplied with an inlet pressure of 20 bar to 50 bar, depending on the synthesis gas process adopted. The synthesis gas screw compressor 110 may compress the ammonia synthesis gas 102 and discharge compressed ammonia synthesis gas 104. The synthesis gas screw compressor 110 may discharge the compressed ammonia synthesis gas 104 with a pressure of 70 bar to 120 bar. According to some exemplary embodiments, the synthesis gas screw compressor 110 may be a single stage oil-flooded screw gas compressor driven by an electric motor or steam turbine.

Upon discharge from the synthesis gas screw compressor 110, the compressed ammonia synthesis gas 104 may be joined by recycle gas 122 from a recycle screw compressor 120 forming gas flow 108. The recycle gas 122 may have a pressure of 76 bar to 116 bar. The combined gas flow 108 may flow to an ammonia synthesis reactor 130, which may operate at a pressure of 70 bar to 120 bar. Partial conversion of the combined gas flow 108 to ammonia may occur. Unconverted gas portions 132 may pass to the recycle screw compressor 120. The unconverted gas portions 132 may have a pressure of 66 bar to 116 bar when passed to the recycle screw compressor 120. The recycle screw compressor 120 may compress the unconverted gas 132 and introduce compressed unconverted recycle gas 122 to the compressed ammonia synthesis gas flow 104 from the synthesis gas screw compressor 110 before returning to the ammonia synthesis reactor 130. The recycle screw compressor 120 may be driven by an electric motor or steam turbine and may compress the recycle gas to a pressure of 76-116 bar, as noted above, for blending with the already compressed syngas. The ammonia synthesis reactor 130 may also discharge ammonia product 134 and purge-gas (not shown), which may be separated to recover hydrogen or which may be sent for fuel use. The ammonia product 134 may be sent to the user or to ammonia storage.

In some embodiments, the ammonia synthesis reactor 130 may be a conventional single or multi-pass converter using one or more magnetite catalyst or using one or more noble metal catalyst based on ruthenium, U.S. Pat. No. 9,150,423 to Hosono et al. The ammonia synthesis reactor 130 may further include a waste heat boiler and an ammonia condenser having any mechanical or chemical system capable of more selectively separating ammonia from a gas mixture including at least hydrogen and nitrogen, as would be understood by a person having ordinary skill in the art. The ammonia condenser may include one or more cryogenic purifiers, including one or more refrigeration exchangers and one or more refrigeration compressors. U.S. Pat. No. 8,926,909 to Filippi et al. describes a method for modernizing the ammonia synthesis loop.

The above referenced screw compressors may be in one of three configurations, as single units, both units on one driver shaft, ("140" in FIG. 1 and "340" in FIG. 3), or as one unit combining both functions. The method may further lead to the utilization of spare heat from a conventional steam reformer and partial oxidation synthesis gas preparation units, which may provide high energy efficiency and low capital cost.

Figure 2:
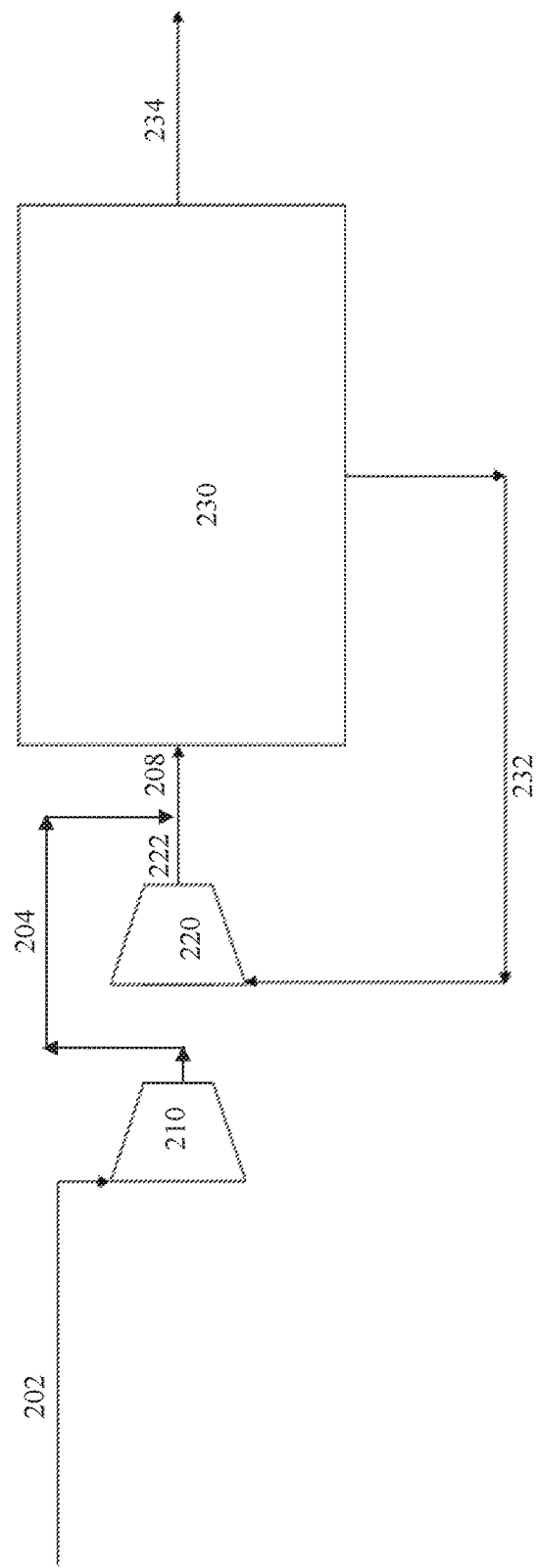
FIG. 2 shows another exemplary block flow chart configuration for the compression of ammonia synthesis gas and recycle gas for the production of ammonia by screw compressors.

Now referring to exemplary FIG. 2, a system utilizing a synthesis gas compressor and recycle gas compressor in series may be disclosed. In some embodiments, the screw compressors may be disposed on a single drive shaft 240. As in the system and process shown in FIG. 1, syngas 202 may be provided to a syngas compressor 210. Recycle gas 232 may be supplied to a recycle gas compressor 220 on the same drive shaft 240 as syngas compressor 210, where recycle gas 232 may be compressed. The compressed syngas 204 may bypass the recycle gas compressor 220 and be introduced and combined with the compressed recycle gas 222 forming compressed gas flow 208, which may be introduced to an ammonia synthesis reactor 230. The synthesis gas compressor 210 and the recycle gas compressor 220 may be disposed on a single driver shaft which may be driven by one electric motor or steam turbine. The ammonia synthesis reactor 230 may in turn discharge ammonia product 234, purge or off gas (not shown) and recycle gas 232, as described above.

Figure 3:
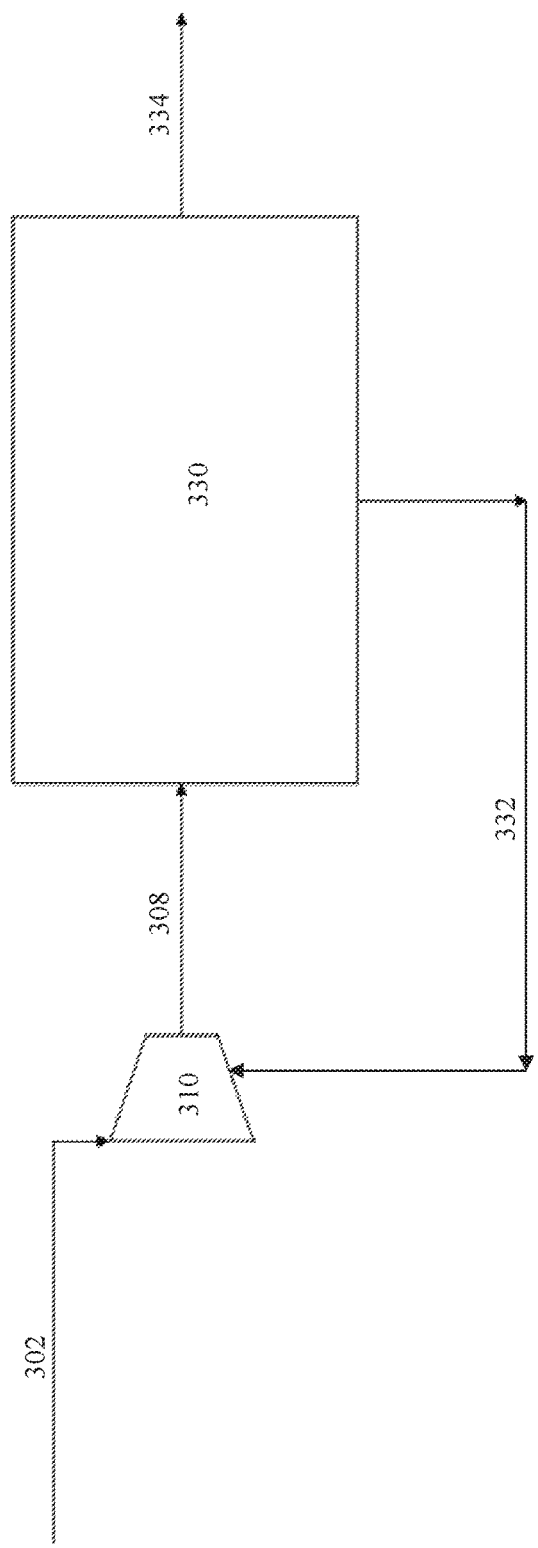
FIG. 3 shows another exemplary block flow chart configuration for the compression of ammonia synthesis gas and recycle gas for the production of ammonia by a screw compressor.

In still further exemplary embodiments, as shown in FIG. 3, the synthesis gas 302 and recycle gas 332 may be combined and compressed in a single synthesis and recycle gas compressor 310. The synthesis and recycle gas compressor 310 may be in one casing and may be driven by one electric motor or steam turbine. The synthesis gas 302 and recycle gas 332 may enter the compressor 310 independently and be combined in compressor 310 forming compressed gas flow 308. According to some embodiments, the recycle gas and synthesis gas may be introduced to the compressor at different stages of compression, based on their prior differences in pressure. For example, the recycle gas may be introduced into the compressor at a later stage of compression. Compressed gas flow 308 may be introduced to an ammonia synthesis reactor 330. The ammonia synthesis reactor 330 may in turn discharge ammonia product 334, purge or off gas (not shown) and recycle gas 332, as described above.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for producing ammonia comprising:
   supplying ammonia synthesis gas to a synthesis gas screw compressor, wherein the ammonia synthesis gas is supplied with an inlet pressure of 20 bar to 50 bar;
   compressing the ammonia synthesis gas in the synthesis gas screw compressor to a pressure of 70 bar to 120 bar;
   discharging a flow of compressed ammonia synthesis gas;
   combining a flow of compressed recycle gas with the flow of compressed ammonia synthesis gas, forming a compressed combined gas flow with a pressure of 76 bar to 116 bar;
   supplying the compressed combined gas flow to an ammonia reactor, wherein the ammonia reactor discharges a produced ammonia, purge gas, and recycle gas having a pressure of 66 bar to 116 bar;
   supplying the recycle gas to a recycle gas screw compressor;
   compressing the recycle gas; and
   supplying the compressed recycle gas to the flow of compressed ammonia synthesis gas.

2. The method of claim 1, wherein the synthesis gas screw compressor and recycle gas screw compressor are disposed on a single shaft.

3. The method of claim 1, wherein the synthesis gas screw compressor and recycle gas screw compressor are disposed on separate shafts.

4. A method for producing ammonia comprising:
   supplying ammonia synthesis gas to a screw compressor;
   introducing a flow of recycle gas to the screw compressor;
   compressing and combining the ammonia synthesis gas and recycle gas in the screw compressor;
   discharging a flow of the compressed ammonia synthesis gas and recycle gas as a combined gas flow;
   supplying the discharged combined gas flow to an ammonia reactor, wherein the ammonia reactor discharges a produced ammonia, purge gas, and recycle gas; and
   supplying the recycle gas to the screw compressor.

5. The method of claim 4, wherein the recycle gas and the ammonia synthesis gas are introduced to the screw compressor independently.

6. An apparatus for producing ammonia comprising:
   an ammonia reactor that receives compressed ammonia synthesis gas and compressed recycle gas and discharges a produced ammonia, a purge gas, and a recycle gas;
   a synthesis gas screw compressor that compresses a flow of ammonia synthesis gas and supplies the flow of compressed ammonia synthesis gas to the ammonia reactor; and
   a recycle gas screw compressor that receives recycle gas from the ammonia reactor, compresses the recycle gas, and introduces the compressed recycle gas to the ammonia reactor,
   wherein the synthesis gas compressor and the recycle gas screw compressor are disposed on a single shaft.

* * * * *